W. V. TURNER.
FLUID PRESSURE BRAKE.
APPLICATION FILED DEC. 10, 1915.
1,194,443.
Patented Aug. 15, 1916.
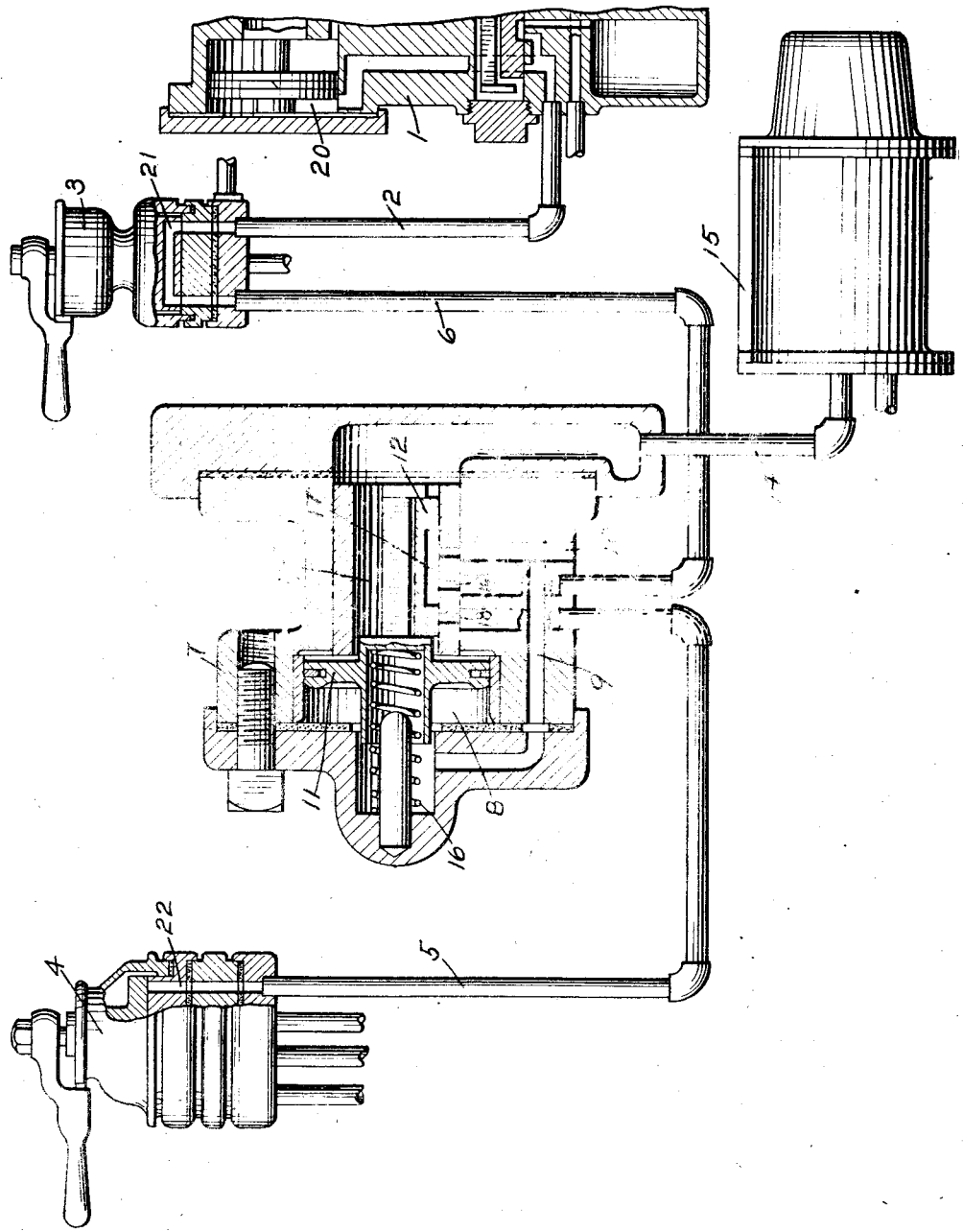
INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,194,443.      Specification of Letters Patent.     Patented Aug. 15, 1916.

Application filed December 10, 1915. Serial No. 66,074.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to an engine brake equipment of the type known as the E T locomotive brake equipment, such as shown and described in my prior Patent No. 1,130,448, dated March 2, 1915.

The above mentioned equipment comprises a distributing valve device for controlling the admission and release of fluid under pressure to and from the engine brake cylinders, an automatic brake valve, and an independent brake valve for controlling the brakes on the engine. With proper manipulation and attention, this equipment has been found to operate satisfactorily as intended, but if the automatic brake valve should accidentally be left in "holding position" instead of the usual running position, the release pipe leading thereto from the application chamber of the distributing valve will be closed and any air which may leak into the application chamber will be retained and will eventually effect an application of the brakes on the engine, and this will be liable to cause overheating and consequent slipping of the driving wheel tires. Also if the application piston should fail to return to release position after an application of the brakes, due to excessive friction, there will be a light brake cylinder pressure retained, which, if permitted to remain in the brake cylinders for any considerable length of time, will cause overheating of the tires.

The principal object of my invention is to provide means for preventing occurrence of the above character and for this purpose I propose to insert a valve device in the release pipe between the automatic and the independent brake valve which will automatically open the application chamber exhaust when there is no air in the brake cylinder, or when the brake cylinder pressure is at a predetermined low degree.

In the accompanying drawing, the single figure is a diagrammatic view of an engine brake equipment with my improvement applied thereto.

The construction shown in the drawing illustrates a brake equipment of the E T type comprising a distributing valve device 1, having a pipe 2 leading to an independent brake valve 3, and an automatic brake valve 4. The automatic section 5 of the release pipe and the independent section 6 lead to a valve device 7 for automatically controlling the release of fluid from the application chamber of the distributing valve.

The valve device 7 may comprise a casing having a piston chamber 8 connected by a passage 9 to an exhaust port 10 and containing a piston 11. A slide valve 12 adapted to be actuated by piston 11 is contained in valve chamber 13 which is connected by pipe 14 to the engine brake cylinders, represented in the drawing by the brake cylinder 15. The piston 11 is subject at all times on one side to the pressure of a spring 16 and atmospheric pressure and on the opposite side to brake cylinder pressure.

When the brakes on the engine are applied and the brake cylinder pressure exceeds a predetermined degree, the resistance of the spring 16 will be overcome and the piston 11 will be shifted to its outer position in which a cavity 17 in the valve 12 connects ports 18 and 19 leading respectively to the pipes 5 and 6, so that the release of fluid from the application chamber 20 of the distributing valve can be controlled by manipulation of the automatic brake valve in the usual manner. If the brake cylinder pressure falls below the predetermined degree, however, the spring 16 will move the piston 11 inwardly, cutting off communication between the pipes 5 and 6 and connecting pipe 6 with exhaust port 10. If the automatic brake valve handle should now be permitted to remain in holding position for any reason, air which may leak into the application chamber will be able to escape to the atmosphere, as will be evident. It will thus be impossible for the brakes to "creep on", as the opening of the application chamber to the exhaust is insured, even though the brake valve handle is left in an improper position. If there is an unusual amount of friction developed in the movement of the application piston, the brake cylinder pressure acting thereon will be high enough to shift the same to release position, since the application chamber is at atmospheric pressure through the connection of the pipe 6 with the exhaust port 10.

Having now described my invention, what I claim as new and desire to secure by Letters Patent, is:

1. The combination with a distributing valve device having an application chamber and a brake valve device for controlling the pressure in said chamber, of means governed by the brake cylinder pressure for controlling the exhaust from the application chamber.

2. The combination with a brake cylinder, a distributing valve device having an application chamber and means controlled by the pressure in said chamber for supplying and releasing fluid to and from the brake cylinder, and a brake valve device for controlling the pressure in said chamber, of means operated upon a reduction in brake cylinder pressure to a predetermined degree for venting fluid from the application chamber.

3. The combination with a brake cylinder and a distributing valve device having an application chamber, variations in pressure in which are adapted to control the pressure in the brake cylinder and a brake valve device for controlling the pressure in said application chamber, of a valve device subject to the opposing pressures of the brake cylinder and a spring and operated upon a predetermined reduction in brake cylinder pressure for opening said application chamber to the exhaust.

4. The combination with a brake cylinder and a distributing valve device having an application chamber, variations in pressure in which are adapted to control the pressure in the brake cylinder and a brake valve device for controlling the pressure in said application chamber, of a piston subject to the opposing pressures of the brake cylinder and a spring and a valve operated by said piston upon a predetermined reduction in brake cylinder pressure for venting fluid from the application chamber.

5. The combination with a distributing valve device having an application chamber, an independent brake valve, and an automatic brake valve for manually controlling the release of fluid from the application chamber through said independent brake valve, of a valve device controlling communication through which fluid is released from the application chamber and operated upon a predetermined reduction in brake cylinder pressure for automatically venting fluid from the application chamber.

In testimony whereof I have hereunto set my hand.

WALTER V. TURNER.